Dec. 25, 1962
D. I. FALES
3,070,185
ELECTRONIC SPEED CONTROL SYSTEM
Filed Oct. 17, 1960
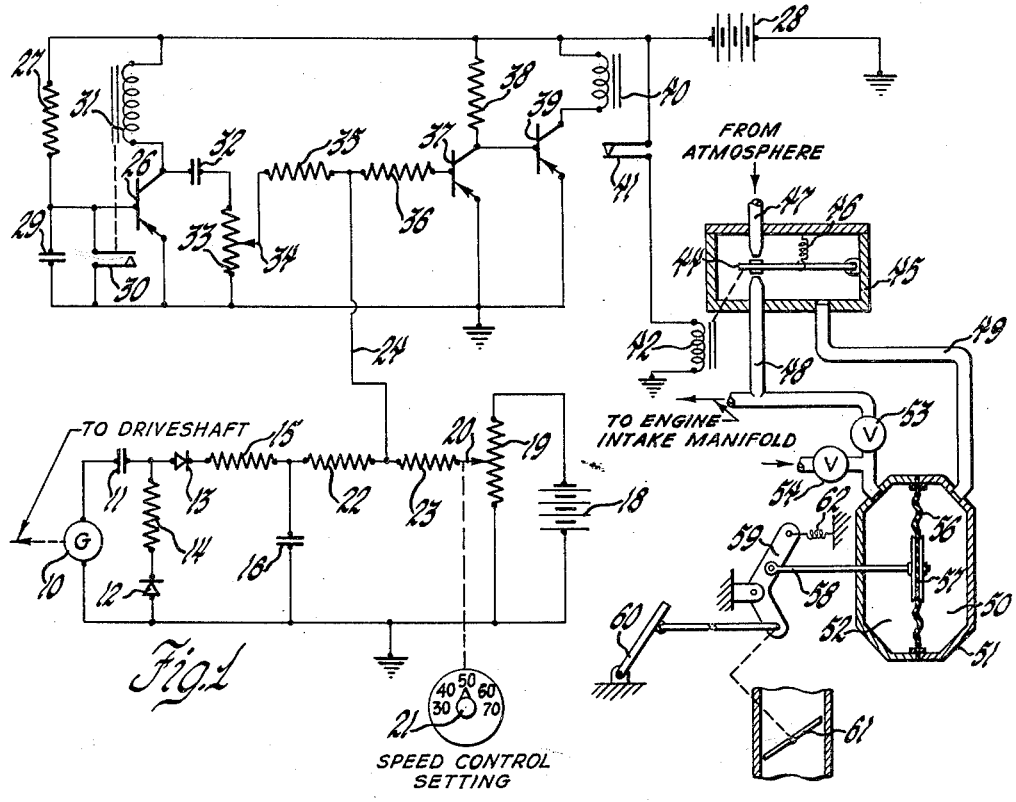
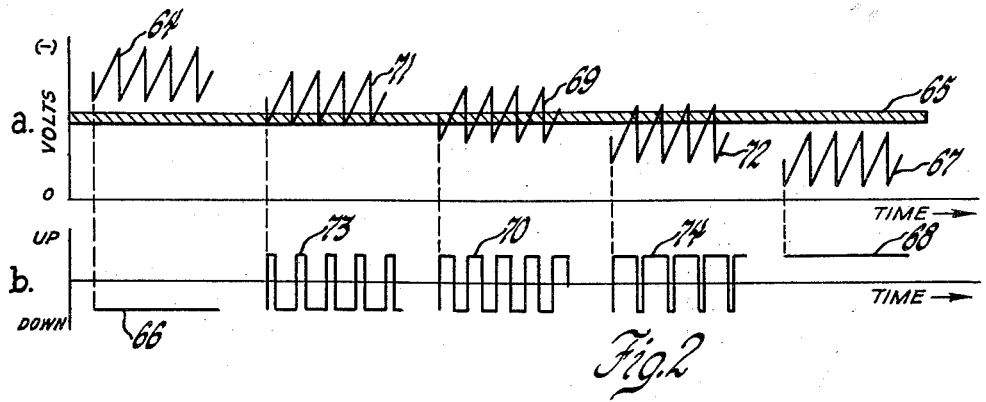
INVENTOR.
Douglas I. Fales
BY
Paul J. Ethington
ATTORNEY

United States Patent Office 3,070,185
Patented Dec. 25, 1962

3,070,185
ELECTRONIC SPEED CONTROL SYSTEM
Douglas I. Fales, Flint, Mich., assignor to General Motors Corporation, Detroit, Mich., a corporation of Delaware
Filed Oct. 17, 1960, Ser. No. 63,092
6 Claims. (Cl. 180—82.1)

This invention relates to a vehicle speed warning and speed control system.

A speed warning and control system for a throttle-controlled vehicle engine is disclosed and claimed in the copending application Serial No. 67,820, assigned to the assignee of the present invention. The system of Serial No. 67,820, as in the present invention, includes apparatus for maintaining a vehicle at a constant speed, or giving a warning when a selected speed is exceeded, by a pneumatically powered arrangement coupled to the accelerator-throttle valve linkage. It is the principal object in the present invention to provide an improved electrical circuit for deriving a control signal for actuating the pneumatically powered throttle positioning system which is described in the above-mentioned copending application. A further object is to provide an electrical circuit adapted to produce an error signal which can be utilized in a vehicle speed warning or speed control system.

In accordance with the present invention, a first electrical signal is provided which is related to the desired vehicle speed while a second signal is generated which is related to the actual vehicle speed. These two signals are compared, and to the sum or difference is added an alternating signal. The combined signal is used to drive a triggering device which is adapted to operate a switch when the signal input exceeds a predetermined level. Electro-mechanical power means are provided to operate the engine throttle valve in response to the operation of the switch.

In the drawings:

FIGURE 1 is a diagrammatic representation of a vehicle speed control and warning system incorporating the principal features of the invention;

FIGURE 2a is a graphic representation of voltage waveforms appearing in the circuit of FIGURE 1 for various conditions of operation; and FIGURE 2b is a graphic representation of the position of the control valve of FIGURE 1 as a function of time.

With reference to FIGURE 1, there is shown an A.C. tachometer generator 10 which has an armature coupled by a suitable mechanical linkage to the vehicle drive shaft. This generator provides an A.C. signal related in frequency to the actual vehicle speed. The output of the tachometer is coupled by a capacitor 11 to a rectifying and integrating network including a pair of diodes 12 and 13 and a pair of resistors 14 and 15 along with a capacitor 16. This arrangement is effective to charge the capacitor 16 on each successive positive half cycle of the generator output, providing a direct voltage related in magnitude to actual vehicle speed. To produce a signal related to the desired vehicle speed, an arrangement comprising a voltage source 18 and a potentiometer 19 is utilized. A movable tap 20 on the potentiometer 19 is mechanically coupled to a speed control setting knob 21 which may be located on the vehicle dashboard. Thus the negative voltage appearing between the tap 20 and ground can be related to desired speed. The capacitor 16 and the tap 20 are coupled through like resistors 22, 23 to a line 24, forming a bridge arrangement such that the voltage appearing on the line 24 will be related to the difference between the positive voltage appearing across the capacitor 16 and the negative voltage appearing between the tap 20 and ground.

To the error voltage appearing on the line 24 is added an alternating signal derived from a sawtooth oscillator which includes the circuit of a transistor 26. The base of this transistor is connected through a resistor 27 to the negative terminal of a voltage source 28. A capacitor 29 is connected between the base and ground while a pair of normally-open relay contacts 30 shunt the base-emitter circuit. The transistor collector is connected through a relay 31 to the negative terminal of the source 28. As the capacitor 29 slowly charges through the resistor 27, and quickly discharges when the contacts 30 close, a sawtooth waveform will be provided which is coupled from the collector of the transistor 26 through a capacitor 32 to a potentiometer 33. A portion of the sawtooth voltage, as determined by the position of a movable tap 34 on the potentiometer 33, is coupled through a resistor 35 to the line 24. The sum of the error voltage appearing on the line 24 and the sawtooth voltage from the tap 34 is coupled through a resistor 36 to the base of a transistor 37. The emitter of this transistor is connected to ground while the collector is connected through a load resistor 38 to the negative terminal of the source 28. The collector is further coupled to the base of a transistor 39 which is likewise in a grounded emitter configuration and which has its collector connected through a relay coil 40 to the source 28. With this two-stage amplifier arrangement, it is seen that the transistor 37 will be cut off and the transistor 39 fully conductive until a negative voltage is applied to the line 24 of a magnitude sufficient to forward bias the emitter-base junction of the transistor 37. Thus the coil 40 will be de-energized until the negative voltage on the line 24 exceeds some predetermined level.

The relay coil 40 operates a pair of normally-closed contacts 41 which are in circuit between the source 28 and a solenoid coil 42. The coil 42 operates a movable armature 44 in a control valve 45. This armature 44 is biased by a spring 46 to an up position, but since the contacts 41 are normally closed, the coil 42 will hold the armature 44 in the down position until the coil 40 is energized. When in the up position, the armature 44 closes off a conduit 47 which is open directly to atmosphere. When in the down position, the armature stops off a conduit 48 which is coupled directly to the engine intake manifold. Thus air at atmospheric pressure can enter the interior chamber of the valve 45 when the coil 42 is energized, while a "vacuum," or engine intake manifold pressure, will exist in the valve chamber when the coil 42 is de-energized. The chamber of the valve 45 is coupled by a conduit 49 to the righthand chamber 50 of a double-acting pneumatic power cylinder 51. The lefthand chamber 52 of the cylinder 51 is coupled through a valve 53 to the engine intake manifold. Alternatively, if the valve 53 is closed and a valve 54 is opened, the chamber 52 may be coupled to the atmosphere. Between the chambers 50 and 52 of the cylinder 51, there is positioned a sealed flexible diaphragm 56. Secured to this diaphragm is a piston 57 which is coupled by a shaft 58 to a pivoted member 59. The opposite end of the pivoted member 59 is coupled by a suitable mechanical linkage to an accelerator 60 and to an engine throttle valve 61 of the vehicle. The pivoted member 59 is biased by a spring 62 in such a way that the accelerator 60 is normally at its "out" position or counterclockwise limit of travel and such that the throttle valve 61 is closed.

The system of FIGURE 1 is capable of two conditions of operation, a speed warning condition and a speed control condition. In the speed warning mode, the valve 53 is closed and valve 54 is opened so that air at atmospheric pressure enters the chamber 52. The knob 21 is turned by the driver to correspond to the speed which he does not wish to exceed. This results in a certain negative voltage existing at the tap 20. If the vehicle speed is much less than the preselected maximum, the integrated ouput of the generator 10 will be relatively low and so the negative voltage at the tap 20 will appear substantially undiminished at the base of the transistor 37. To this, of course, will be added the sawtooth output at an amplitude selected by tap 34 resulting in a combined signal such as the waveform 64 of FIGURE 2a wherein the voltage existing at the input to the transistor 37 is shown in graphic form. The waveform 64 is at all times above a level 65 which represents the triggering range of the circuit including the transistors 37 and 39. With this input the transistor 37 will conduct fully and a large voltage drop will appear across the resistor 38, biasing the transistor 39 to cut off. Thus the contacts 41 will remain closed so that the coil 42 will be energized, holding the armature 44 down and allowing air at atmospheric pressure to enter the control valve and so to enter the chamber 50 of the cylinder 51. The pressures on each side of the diaphragm 56 are then equal and no force is exerted on the pivoted member 59 or on the accelerator 60. However, if the vehicle speed is above the desired speed limit, the output of the generator 10 will produce a positive voltage across the capacitor 16 which is large relative to the negative voltage at the tap 20. Combined with the sawtooth voltage, the input to the transistor 37 will resemble a waveform 67 of FIGURE 2a, wherein the triggering level 65 is never exceeded. Thus the transistor 37 will be cut off, cutting on the transistor 39 and opening the contacts 41. This deenergizes the coil 42 and allows the armature 44 to move up and the armature will remain in the position as illustrated by the line 68 in FIGURE 2b. Thus the outlet of the conduit 48 will remain open and intake manifold vacuum will appear in the chamber 50 of the power cylinder 51 so that atmospheric pressure in the chamber 52 will tend to force the diaphragm 56 to the far right, rotating the member 59 clockwise and pushing up on the accelerator. This will, of course, warn the driver that he is exceeding the desired speed limit and to maintain the vehicle at a speed higher than the speed limit, the driver must then exert a much greater force on the accelerator.

When the vehicle speed is approximately equal to the desired speed, the voltage existing at the line 24 will be approximately equal to the triggering level 65. Combined with the sawtooth voltage, a waveform 69 will result as shown in FIGURE 2b and this signal, when applied to the input of the transistor 37, is effective to drive the transistor 37 alternately on and off. This produces a periodic cycling of the armature 44 as indicated by the line 70 of FIGURE 2b, resulting in a pressure in the chamber 50 of some intermediate value between atmospheric and intake manifold pressures. Accordingly, some pressure is exerted on the accelerator, indicating to the driver that he should not increase the vehicle speed. There is a range of speed warning operation between full-on and full-off as illustrated by the waveforms 71 and 72 in FIGURE 2a which represent inputs to the transistor 37 at speeds slightly below and slightly above the speed limit. These result in armature position sequences as illustrated by the lines 73 and 74 in FIGURE 2b. Thus there is provided a region of proportional control in the range immediately above and below the selected speed limit.

When the apparatus of FIGURE 1 is operated in the speed control mode, the valve 54 is closed and the valve 53 is opened, allowing intake manifold vacuum to appear in the chamber 52. This results in a tendency for the piston 57 to move to the left and the accelerator 60 to be pulled down, opposing the bias of the spring 62. The driver selects the desired speed which he wishes the vehicle to maintain by setting the knob 21, and takes his foot off the accelerator pedal. If the vehicle speed is far below the desired speed, the voltage on the line 24 will be highly negative, producing an input to the transistor 37 which resembles the waveform 64 of FIGURE 2a. This maintains the armature 44 in a down position as shown by the line 66 and allows air at atmospheric pressure into the chamber 50. The pressure differential across the diaphragm 56 is now great and the piston 57 is forced to the far left, opening the throttle valve 61 and accelerating the vehicle.

If the vehicle accelerates past the desired speed, the positive voltage across the capacitor 16 will be large relative to the negative voltage at the tap 20, and a voltage resembling the waveform 67 of FIGURE 2a will exist at the input to the transistor 37. Thus the armature 44 will remain in the up position, as indicated by the line 68, and intake manifold vacuum will appear in the chamber 50. Thus equal pressures will exist on each side of the diaphragm 56 and no force results therefrom on the pivoted member 59. The spring 62 will then tend to close the throttle 61, reducing vehicle speed.

When the vehicle is at the desired speed, input to the transistor 37 resembles the waveform 69, driving the transistor alternately conductive and non-conductive. This cycles the armature 44 as shown by the line 70, resulting in a pressure in the chamber 50 intermediate the atmospheric and intake manifold pressures. The pivoted member 59 is thus rotated counterclockwise to an extent determined by the tension on the spring 62, maintaining the throttle valve 61 partly open. Depending upon the selected speed, the dwell time of the armature 44 in the up position may vary slightly from a nominal 50%, this being determined by what pressure differential is necessary to maintain the correct throttle position. As in the speed warning mode, the speed control mode also includes a region of proportional control immediately above and below the desired speed, as illustrated by the waveforms 71 and 72 and the lines 73 and 74 of FIGURE 2.

It should be noted that the sawtooth waveform, for optimum performance, should be somewhat smaller in peak-to-peak amplitude than the magnitude of the level 65 but appreciably greater than the range of operation of the triggering device. This provides a positive, two-state operation.

While this invention has been described in terms of an illustrative embodiment, it is of course understood that various modifications may be made by persons skilled in the art. Thus it is contemplated that the appended claims will cover any such modifications as fall within the true scope of the invention.

I claim:

1. In engine throttle control apparatus, means for generating a first direct voltage related to engine speed, means for providing a second direct voltage related to desired speed, means connected to receive said first and second voltages and adapted to produce a third direct voltage related to the relative magnitudes of said first and second voltages, means for producing an alternating voltage having constant period and amplitude, means connected to receive said third voltage and said alternating voltage and adapted to produce a combined voltage corresponding to the sum thereof, switching means connected to receive said combined voltage and adapted to be opened when said combined voltage exceeds a triggering level and to be closed when said combined voltage is less than said level, the portion of said contact period during which said combined voltage exceeds said triggering level being varied with the magnitude of said third voltage and power means responsive to said switching means and adapted to tend to close said throttle when the dwell time of said switching means in the open position exceeds a predetermined percentage of time.

2. In a speed warning system for a vehicle having a throttle controlled engine, means for generating a first direct voltage related to actual vehicle speed, means for providing a second direct voltage related to desired vehicle speed, means connected to receive said first and second voltages and adapted to produce a third direct voltage related to the difference between the magnitudes of said first and second voltages, means for producing an alternating voltage of sawtooth waveform, means connected to receive said third voltage and said alternating voltage and adapted to produce a combined voltage corresponding to the sum thereof, switching means connected to receive said combined voltage and adapted to be opened when said combined voltage is greater than a first level and to be closed when said combined voltage is less than a second level, the portion of the cycle of said alternating voltage during which said combined voltage exceeds said triggering level being varied with the magnitude of said third voltage, a pneumatic power means including a housing, displaceable means defining two pneumatic chambers within said housing and adapted to vary the volume ratio therebetween, said displaceable means being mechanically coupled to said throttle, and an electrically operated control valve connected to be responsive to said switching means whereby relatively high pressure air is admitted to one chamber of said pneumatic power means when said switching means is closed such that said displaceable means tends to close said throttle, said alternating voltage being smaller in amplitude than said second level and being greater in amplitude than the difference between said first and second levels.

3. In a control system for a vehicle having a throttle controlled engine, means for generating a first direct voltage related to actual vehicle speed, means for providing a second direct voltage related to desired vehicle speed, means connected to receive said first and second voltages and adapted to produce a third direct voltage related to the relative magnitudes of said first and second voltages, means for producing an alternating voltage of sawtooth waveform, means connected to receive said third voltage and said alternating voltage and adapted to produce a combined voltage corresponding to the sum thereof, switching means connected to receive said combined voltage and adapted to be closed when said combined voltage exceeds a triggering level and to be opened when said combined voltage is less than said triggering level, the portion of the cycle of said alternating voltage during which said combined voltage is greater than said first level and less than said second level being varied in accordance with the amplitude of said third voltage, double-acting pneumatic power means including a housing, displaceable means defining two pneumatic chambers within said housing and adaped to vary the volume ratio therebetween, said displaceable means being mechanically coupled to said throttle, one of said pneumatic chambers being connected to the intake manifold of said engine, an electrically operated control valve connected to the other of said pneumatic chambers and adapted to admit air at atmospheric pressure thereto when energized and to admit air at intake manifold pressure when de-energized, said control valve being connected in circuit with said switching means, and means biasing said throttle to a closed position.

4. In a throttle control system for an automotive vehicle, means for generating a first direct voltage related to engine speed, means for providing a second direct voltage related to desired speed, circuit means connected to compare said first and second direct voltages and adapted to produce a third direct voltage indicative of the difference in the magnitude of said first and second voltages, means for producing an alternating voltage of saw-tooth waveform, summing means connected to receive said third voltage and said alternating voltage and adapted to produce a combined voltage corresponding to the sum thereof, triggering means connected to receive said combined voltage and to produce an output when the magnitude of the combined voltage exceeds a predetermined level, switching means connected to receive the output of said triggering means and adapted to be switched thereby, power means connected to said switching means and adapted to vary the position of the vehicle throttle in response to the state of said switching means.

5. In engine throttle control apparatus, means for generating a first relatively slowly varying signal quantity proportional to actual engine speed, means for producing a second signal quantity proportional to desired engine speed, means connected to receive the first and second signal quantities and adapted to produce an error signal quantity related to the difference between the quantities, means for generating a relatively rapidly varying alternating signal quantity, combining means for adding the alternating signal quantity to the error signal quantity, trigger means connected to the combining means and responsive to the sum of the error and alternating signal quantities to produce an output signal when the sum exceeds a predetermined signal level, the portion of the cycle of the alternating signal quantity during which the sum exceeds the predetermined signal level being variable with the magnitude of the error signal quantity over a magnitude range equal to the amplitude of the alternating signal quantity, power means connected to the trigger means and mechanically connected to the engine throttle, the power means being responsive to the output of the trigger means to alter the setting of the throttle in a manner tending to produce a coincidence between the first and second signal quantities.

6. In control apparatus, means for generating a relatively slowly varying signal quantity proportional to a condition being monitored, means for generating a relatively rapidly varying alternating signal quantity, combining means for adding the alternating signal quantity to the slowly varying signal quantity, trigger means connected to the combining means and responsive to the sum of the slowly varying and alternating signal quantities to produce an output signal when the sum exceeds a predetermined signal level, the portion of the cycle of the alternating signal quantity during which the sum exceeds the predetermined signal level being varied with the magnitude of the slowly varying signal quantity over a magnitude range equal to the amplitude of the alternating signal quantity, power means connected to the trigger means and responsive to the output signal to perform the first function when the output signal is present and a second function when the output signal is absent.

References Cited in the file of this patent

UNITED STATES PATENTS

| | | |
|---|---|---|
| 1,767,609 | Murray | June 24, 1930 |
| 2,201,629 | McCullough | May 21, 1940 |
| 2,493,755 | Ferrill | Jan. 10, 1950 |
| 2,685,871 | Block | Aug. 10, 1954 |
| 2,842,108 | Sanders | July 8, 1958 |
| 2,883,975 | Spetner | Apr. 28, 1959 |
| 2,908,264 | Kerr | Oct. 13, 1959 |
| 2,913,921 | Gordon | Nov. 24, 1959 |